(12) United States Patent
Yu et al.

(10) Patent No.: US 12,346,657 B2
(45) Date of Patent: Jul. 1, 2025

(54) TRANSFORMER ASSISTED JOINT ENTITY AND RELATION EXTRACTION

(71) Applicant: NEC Laboratories America, Inc., Princeton, NJ (US)

(72) Inventors: Xiao Yu, Princeton, NJ (US); Yanchi Liu, Monmouth Junction, NJ (US); Haifeng Chen, West Windsor, NJ (US); Yufei Li, Dallas, TX (US)

(73) Assignee: NEC Corporation, Tokyo (JP)

( * ) Notice: Subject to any disclaimer, the term of this patent is extended or adjusted under 35 U.S.C. 154(b) by 356 days.

(21) Appl. No.: 17/883,040

(22) Filed: Aug. 8, 2022

(65) Prior Publication Data
US 2023/0076127 A1 Mar. 9, 2023

Related U.S. Application Data

(60) Provisional application No. 63/299,474, filed on Jan. 14, 2022, provisional application No. 63/232,688, filed on Aug. 13, 2021.

(51) Int. Cl.
*G06F 40/295* (2020.01)
*G06F 21/57* (2013.01)
*G06F 40/40* (2020.01)

(52) U.S. Cl.
CPC .......... *G06F 40/295* (2020.01); *G06F 21/577* (2013.01); *G06F 40/40* (2020.01); *G06F 2221/034* (2013.01)

(58) Field of Classification Search
CPC ...... G06F 40/295; G06F 21/577; G06F 40/40; G06F 2221/034; G06F 40/237
See application file for complete search history.

(56) References Cited

U.S. PATENT DOCUMENTS 11,393,141 B1 * 7/2022 Hsu .................. G06N 5/025
12,086,546 B2 * 9/2024 Meyerzon ............ G06F 16/906
(Continued)

FOREIGN PATENT DOCUMENTS

EP          3716111 A1 *  9/2020 .......... G06F 21/554
WO   WO-2020243846 A1 * 12/2020 .......... G06F 16/13
WO   WO-2021150676 A1 *  7/2021 .......... G06F 40/295

OTHER PUBLICATIONS

Zara Nasar, SyedWaqar Jaffry, and Muhammad Kamran Malik. 2021. Named Entity Recognition and Relation Extraction: State-of-the-Art. ACM Comput. Surv. 54, 1, Article 20 (Feb. 2021), 39 pages. https://doi.org/10.1145/3445965 (Year: 2021).*

(Continued)

*Primary Examiner* — Paras D Shah
*Assistant Examiner* — Mulugeta Tuji Dugda
(74) *Attorney, Agent, or Firm* — Joseph Kolodka

(57) ABSTRACT

Systems and methods are provided for adapting a pretrained language model to perform cybersecurity-specific named entity recognition and relation extraction. The method includes introducing a pretrained language model and a corpus of security text to a model adaptor, and generating a fine-tuned language model through unsupervised training utilizing the security text corpus. The method further includes combining a joint extraction model from a head for joint extraction with the fine-tuned language model to form an adapted joint extraction model that can perform entity and relation label prediction. The method further includes applying distant labels to security text in the corpus of security text to produce security text with distant labels, and performing Distant Supervision Training for joint extraction on the adapted joint extraction model using the security text to transform the adapted joint extraction model into a (Continued)

Security Language Model for name-entity recognition (NER) and relation extraction (RE).

19 Claims, 9 Drawing Sheets

(56) References Cited

U.S. PATENT DOCUMENTS

| | | | |
|---|---|---|---|
| 2021/0034701 A1* | 2/2021 | Fei | G06N 3/044 |
| 2021/0295822 A1* | 9/2021 | Tomkins | G06F 16/3338 |
| 2022/0121822 A1* | 4/2022 | Zhou | G06F 16/3344 |

OTHER PUBLICATIONS

Verga, Patrick, "Extracting and Representing Entities, Types, and Relations" (2019). Doctoral Dissertations. 1772. https://scholarworks.umass.edu/dissertations_2/1772 (Year: 2019).*

Adelani et al., "Distant Supervision and Noisy Label Learning for Low Resource Named Entity Recognition: a Study on Hausa and YorÙb'a", arXiv:2003.08370v2 [cs.CL], Mar. 31, 2020, pp. 1-9.

Song et al., "Learning from Noisy Labels with Deep Neural Networks: A Survey", arXiv:2007.08199v7 [cs.LG] Mar. 10, 2022, pp. 1-19.

Mintz et al., "Distant supervision for relation extraction without labeled data", Proceedings of the 47th Annual Meeting of the ACL and the 4th IJCNLP of the AFNLP, Aug. 2009, pp. 1003-1011.

Lafferty et al., "Conditional Random Fields: Probabilistic Models for Segmenting and Labeling Sequence Data", Proceedings of the 18th International Conference on Machine Learning 2001 (ICML 2001), Jun. 28, 2001, pp. 282-289.

Zhou et al., "Clinical Temporal Relation Extraction with Probabilistic Soft Logic Regularization and Global Inference", arXiv:2012.08790v1 [cs.CL], Dec. 16, 2020, pp. 1-10.

* cited by examiner

TRANSFORMER ASSISTED JOINT ENTITY AND RELATION EXTRACTION

RELATED APPLICATION INFORMATION

This application claims priority to U.S. Provisional Patent Application No. 63/232,688, filed on Aug. 13, 2021, and U.S. Provisional Patent Application No. 63/299,474, filed on Jan. 14, 2022, both incorporated herein by reference in its entirety.

BACKGROUND

Technical Field

The present invention relates to natural language processing and more particularly to natural language processing for Cybersecurity using a transformer.

Description of the Related Art

Named Entity Recognition (NER) is a classification task that identifies words in a text that refer to entities (e.g., dates, person, organization and location names). Relation extraction may be based on supervised learning of relations from small hand-labeled corpora. In supervised approaches, sentences in a corpus are first hand-labeled for the presence of entities and the relations between them, but labeled training data is expensive to produce and thus limited in quantity. Because the relations are based on a particular type of corpus, the resulting classifiers can be biased toward that text domain.

Unsupervised information extraction, extracts strings of words between entities in large amounts of text, and clusters and simplifies these word strings to produce relation-strings. The resulting relations may not be easy to map to relations needed for a particular knowledge base (KB).

Distant supervision is similar to the use of weakly labeled data, and combines supervision by a database with integrating data from multiple sentences to decide if a relation holds between two entities. If two entities participate in a relation, any sentence that contain those two entities might express that relation. Distant supervision uses a training set of relations and entity pairs that participate in the relations, where entities are identified in sentences using a named entity tagger that labels persons, organizations and locations. Named entity tagging can provide each word with a person, location, organization, miscellaneous, or none label. Features can be extracted from a sentence and added to a feature vector for the relation. Information from many different mentions of the same relation may be combined.

In training, the features for identical tuples (relation, entity1, entity2) from different sentences can be combined, creating a richer feature vector. A pair of entities appearing together in a sentence can be considered a potential relation instance, and whenever those entities appear together, features are extracted on the sentence and added to a feature vector for that entity pair. Each feature can describe how two entities are related in a sentence, using either syntactic or non-syntactic information. Lexical features can describe specific words between and surrounding the two entities in the sentence in which they appear.

SUMMARY

According to an aspect of the present invention, a method is provided for adapting a pretrained language model to perform cybersecurity-specific named entity recognition and relation extraction. The method includes introducing a pretrained language model and a corpus of security text to a model adaptor, and generating a fine-tuned language model through unsupervised training on the pretrained model by the model adapter utilizing the security text corpus. The method further includes combining a joint extraction model from a head for joint extraction with the fine-tuned language model to form an adapted joint extraction model that can perform entity and relation label prediction. The method further includes applying distant labels to security text in the corpus of security text to produce security text with distant labels, and performing Distant Supervision Training for joint extraction on the adapted joint extraction model using the security text with the distant labels to transform the adapted joint extraction model into a Security Language Model for name-entity recognition (NER) and relation extraction (RE).

According to another aspect of the present invention, a method is provided for adapting a pretrained language model to perform cybersecurity-specific named entity recognition and relation extraction. The method includes introducing a pretrained GPT-2 language model and a corpus of security text to a model adaptor, wherein the GPT-2 is a multilayer bidirectional Transformer that converts an input sequence of the cybersecurity text sequence into token-level representations, $H^0 = \{h_t\}_{t=1}^T$, where $h_t \in \mathbb{R}^d$ is a d-dimensional vector corresponding to a t-th token in a cybersecurity text sentence. The method further includes generating a fine-tuned language model through unsupervised training on the pretrained model by the model adapter utilizing the security text corpus, and combining a joint extraction model from a head for joint extraction with the fine-tuned language model to form an adapted joint extraction model that can perform entity and relation label prediction. The method further includes applying distant labels to security text in the corpus of security text to produce security text with distant labels, and performing Distant Supervision Training for joint extraction on the adapted joint extraction model using the security text with the distant labels to transform the adapted joint extraction model into a Security Language Model for name-entity recognition (NER) and relation extraction (RE).

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
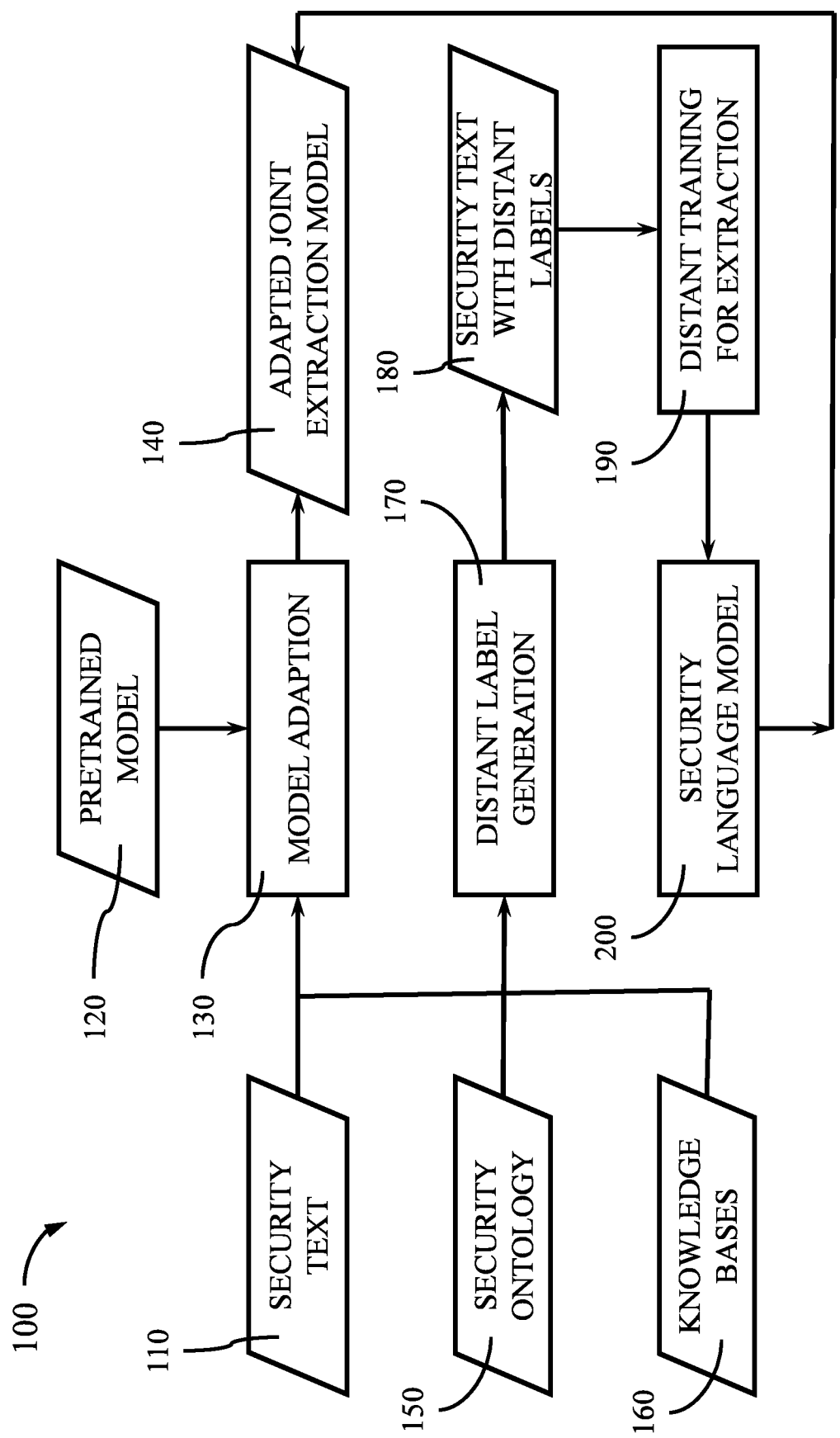
FIG. 1 is a block/flow diagram illustrating a high-level system/method for a Natural Language Processing Model for Cybersecurity, in accordance with an embodiment of the present invention.

In accordance with embodiments of the present invention, systems and methods are provided for applying natural language processing (NLP) techniques to extract structured knowledge from unstructured text, where the unstructured text can relate to security knowledge and imminent threats. Joint entity and relation extraction aims to detect entity pairs along with their relations using a single model. If an entity pair have a relationship in a knowledge base (KB), sentences that contain this pair are assumed to express the corresponding relation.

In accordance with embodiments of the present invention, systems and methods are provided to build a Natural Language Processing Model for Cybersecurity under low-resource scenario.

In accordance with embodiments of the present invention, systems and methods are provided for generating an adapted joint extraction model from a pretrained language model, that can identify security terms in security databases and crowd-source platform for security practitioners.

In accordance with embodiments of the present invention, systems and methods are provided for a sequence tagging scheme using a pre-trained GPT-2 transformer for simultaneously detecting entities and their overlapping relations. Attention regularization and logic fusion help the model to study important relation features and entity-relation dependencies. The learned model can help select trustable instances and build a versatile relation pattern set. A bootstrap learning procedure is built to iteratively improve the model, the trustable training instances, and the trustable pattern set.

In accordance with embodiments of the present invention, systems and methods are provided for preparing a large amount of high-quality training data, i.e., cybersecurity text with annotated labels, wherein an auto-labeling method may reduce or eliminate the need of manual annotation.

Security knowledge may be shared in natural language text. Security practitioners and researchers read such text and apply the digested knowledge in security tasks and tools, such as vulnerability scanning, intrusion detection, threat modeling, and penetration testing. Disseminating security knowledge by humans separately via shared text is costly and burdensome, mainly due to the amount and the fragmentation of the knowledge and lack of coordination. The increasing amount of security text results in delays of the processing and understanding of critical security knowledge, which in turn increases the mean time to take action against imminent threats. The fragmentation of the knowledge forces security practitioners to search, investigate, and unify relevant information from different sources in order to get a big picture on security problems to solve.

In accordance with embodiments of the present invention, systems and methods are provided to/for building an NLP model without manually annotated labels to perform cyber-security-specific named entity recognition and relation extraction.

In many security applications, such structured knowledge can be security-specific named entities (e.g., phrases representing software products, threats, vulnerabilities) and relations between entities (e.g., what software product is affected by which vulnerability). The application of NLP techniques in specific domains, like cybersecurity, faces a major challenge of low resources. Building an effective NLP pipeline for text processing requires sufficient and representative training data, i.e., text with manually annotated labels indicating structured knowledge. One can use such training data to train language models that perform extraction of structured knowledge (e.g., named entities and relations).

In the cybersecurity domain, there is not enough publicly available training data (with manually annotated labels) to use; and cybersecurity text contains special terms, jargons, and computer-related indicators resembling text (e.g., file paths) that are nowhere to be found in general domain text and cannot be processed by NLP models trained on general domain text.

In various embodiments, a cybersecurity ontology can provide a schema of structured knowledge, where this ontology can include entity types and relations that are meaningful to cybersecurity and used as labels on unstructured cybersecurity text.

In various embodiments, an auto-labeling method can provide distant (noisy) labels to cybersecurity text without manual annotation, where a sentence is noisy due to the lack of corresponding relation patterns.

This approach can leverage cybersecurity-related dictionaries, Common Weakness Enumeration (CWE) and Common Platform Enumeration (CPE), and general knowledge bases (e.g., WikiData) to query if some text phrases have specific security meanings. This method also maps the phrases that have matches in external dictionaries and knowledge bases (KB) to the cybersecurity ontology to provide labels to cybersecurity text as training data. In order to cheaply acquire a large amount of labeled joint training data, distant supervision (DS) can automatically generate training data by aligning a knowledge base (KB) with an unlabeled corpus. These labels may be noisy and incorrect due to inaccurate and/or partial matches in the external dictionaries and knowledge bases. It can assume that if an entity pair have a relationship in a KB, all sentences that contain this pair also express the same corresponding relation. Distant supervision (DS) can also generate noisy and incomplete entity labels, which can degrade the performance of the joint extraction model.

In various embodiments, a model adaptation method can be used to reuse an unsupervised language model pretrained on general domain text and fine-tune it into a security-specific model to provide semantic representations for cybersecurity text. This method trains an existing model in an unsupervised way to let the model pick up special language patterns used in cybersecurity text, where it may save the overall training costs (the required data, time, energy) by not training a model from scratch.

In various embodiments, a joint extraction model based on the fine-tuned language model may be used to extract named entities and relations jointly from a cybersecurity text corpus. This joint extraction model provides flexibility in different downstream tasks. Some downstream tasks may require named entities as input, while the others may require both named entities and relations. By doing named entity recognition (NER) and relation extraction (RE) jointly, a single model is trained and can be used for different tasks.

In various embodiments, a distant supervision training method can be used to train the joint extraction model with distantly labeled (noisy) text. As the auto-labeled text contains noisy labels, this method may determine and select data points that would be less likely to contain noise. Then the method can use the selected data points to train the joint extraction model to minimize interference from noisy data points.

In various embodiments, the model can (1) provide vector-space representations for cybersecurity text, (2) perform named entity recognition to extract entities that have security meanings, and (3) perform relation extraction to identify relations among extracted entities. These three features enable various downstream security tasks that rely on natural language processing techniques.

In various embodiments, a Pretrained Language Model is an input to a Model Adaptor. The Pretrained language model can be, for example, GPT-2 or BERT, which are trained on a large amount of general text data, in contrast to domain-specific text data.

In various embodiments, the Security Text is a corpus input to a Model Adaptor. Security Text may be obtained from CVEs describing vulnerabilities from the National Vulnerability Database (NVD) and various software/hardware vendors, and threat reports describing past attack details and technical information from security vendors.

In various embodiments, the Model Adaptor can transform a pretrained language model to an adapted joint extraction model for cybersecurity text. A model adaptation method can reuse an unsupervised language model pretrained on general domain text (e.g., BERT, GPT-2, etc.), and fine-tune it into a security-specific model to provide semantic representations for cybersecurity text. The pretrained model may not capture semantics and representations for domain-specific text (cybersecurity-specific text including function names, filenames in this case), whereas after adaptation through the Model Adaptor, the adapted joint extraction language model can capture and provide representations to those domain-specific text. The model adaptation method can reduce the amount of data needed for training the adapted joint extraction model for cybersecurity text, and a distant supervision training method can make model training on noisy training data feasible.

In various embodiments, the Security Ontology describes the structure of knowledge one would want to extract from security text in a cybersecurity text corpus. The Security Ontology can include eight entity types and seven relation types, for example, the types of entities and relations between these entities.

In various embodiments, the eight entity types can be: (1) VULN denoting a vulnerability entity, e.g., the phrase "CrossSite Scripting" is a known phrase of vulnerability; (2) ACTOR denoting malicious actors that pose threats, e.g., "a remote attacker" is a descriptive phrase for this type; (3) THREAT denoting a descriptive entity of threats to a target system, e.g., "DLL preloading attack" is an example, (4) FUNCTION denoting a program function name that often appears in security-related reports, (5) FILE denoting a filename, (6) PRODUCT denoting a product name, e.g., "Google Chrome", (7) VERSION denoting the version number of a product, e.g., "4.2", "5.x" and so on, and (8) OBJECT denoting miscellaneous entities described by various technical terms, e.g., "memory" and "buffer".

In various embodiments, the seven relation types can be: (1) VULN_RESULTS_IN_THREAT indicating a potential causal relation between VULN and THREAT entities, (2) VULN_AFFECTS_PRODUCT indicating the effect of a VULN entity on a PRODUCT entity, (3) VULN_HAS_ROOT_CAUSE_IN_FUNCTION indicating a causal relation between VULN and FUNCTION entities, (4) VULN_HAS_ROOT_CAUSE_IN_FILE indicating a causal relation between VULN and FILE entities, (5) ACTOR_EXPLOITS_VULN indicating that an ACTOR entity exploits a VULN entity, (6) THREAT_INVOLVES_OBJECT indicating that a THREAT entity involves one or more OBJECT entities in the course of an instance of cyberattack, (7) PRODUCT_HAS_VERSION indicating a PRODUCT entity has a specific VERSION.

In various embodiments, the adapted joint extraction model can include an adapted language model and a joint extraction model, and it is to be trained for the final output model, the Security language model for NER and RE. The fine-tuned language model may be used to extract named entities and relations jointly from a cybersecurity text corpus.

It is to be understood that aspects of the present invention will be described in terms of a given illustrative architecture; however, other architectures, structures, components, and process features and steps can be varied within the scope of aspects of the present invention.

Referring now in detail to the figures in which like numerals represent the same or similar elements and initially to FIG. 1, a high-level system/method for a Natural Language Processing Model for Cybersecurity is illustratively depicted in accordance with one embodiment of the present invention.

In one or more embodiments, security text 110 is an input to a model adaptor 130, where the security text 110 can be inputted as a corpus. Security text 110 can be obtained from Common Vulnerabilities and Exposures (CVE) database(s) for publicly known security vulnerabilities describing vulnerabilities from the National Vulnerability Database (NVD) and various software/hardware vendors, and threat reports describing past attack details and technical information from security vendors. The Security Text 110 can be in a natural language (e.g., English, etc.), so suitable for Natural Language Processing (NLP).

In various embodiments, a Pretrained Language Model 120 is another input to the model adaptor 130, where the Pretrained Language Model 120 can be, for example, GPT-2 or BERT, which are trained on a large amount of general text data, in contrast to domain-specific text data. The Pretrained Language Model 120 can be trained for NLP.

In a non-limiting exemplary embodiment, Hugging-Face pre-trained "gpt2-medium" that uses 24 transformer layers and attention heads with the embedding size, $d_s$=768, is used. For all baselines, the hidden vector size is set to 300. In regularization training, parameters $\alpha$ and $\beta$ are set to 1 and 0.5, respectively. We implement the framework and all baselines in PyTorch, with Adam as the optimizer and the initial learning rate as $10^{-5}$. We set the dropout rate as 0.1 and batch size as 8. For instance selection, an appropriate confidence threshold is set to 0.5 which could be various in other datasets. And we take max 5 new patterns in a loop for each relation type. In the bootstrap procedure, we run 5 epochs in the first loop, and 1 epoch in every rest loop until the validation performance does not increase.

In various embodiments, a model adaptation method can transform the pretrained language model 120 to an adapted joint extraction model 140 for cybersecurity text. The adapted joint extraction model 140 can incorporate an adapted language model (also referred to as a fine-tuned language model) from the Pretrained Language Model 120 and the Security Text 110, and a joint extraction model from a Head for joint extraction for entity and relation label prediction. The adapted joint extraction model 140 can then be trained for the final Security Language Model 200 for name-entity recognition (NER) and relation extraction (RE). By doing named entity recognition and relation extraction jointly, a single model is trained and can be used for different tasks.

Security Ontology 150 describes the structure of knowledge one would want to extract from the security text 110. The Security Ontology 150 can include eight entity types and seven relation types.

In various embodiments, the eight entity types can be, for example, (1) VULN denoting a vulnerability entity, e.g., the phrase "CrossSite Scripting" is a known phrase of vulnerability; (2) ACTOR denoting malicious actors that pose threats, e.g., "a remote attacker" is a descriptive phrase for this type; (3) THREAT denoting a descriptive entity of threats to a target system, e.g., "DLL preloading attack" is an example, (4) FUNCTION denoting a program function name that often appears in security-related reports, (5) FILE denoting a filename, (6) PRODUCT denoting a product name, e.g., "Google Chrome", (7) VERSION denoting the version number of a product, e.g., "4.2", "5.x" and so on, and (8) OBJECT denoting miscellaneous entities described by various technical terms, e.g., "memory" and "buffer".

In various embodiments, the seven relation types can be, for example, (1) VULN_RESULTS_IN_THREAT indicating a potential causal relation between VULN and THREAT entities, (2) VULN_AFFECTS_PRODUCT indicating the effect of a VULN entity on a PRODUCT entity, (3) VULN_HAS_ROOT_CAUSE_IN_FUNCTION indicating a causal relation between VULN and FUNCTION entities, (4) VULN_HAS_ROOT_CAUSE_IN_FILE indicating a causal relation between VULN and FILE entities, (5) ACTOR_EXPLOITS_VULN indicating that an ACTOR entity exploits a VULN entity, (6) THREAT_INVOLVES_OBJECT indicating that a THREAT entity involves one or more OBJECT entities in the course of an instance of cyberattack, (7) PRODUCT_HAS_VERSION indicating a PRODUCT entity has a specific VERSION.

In various embodiments, a Distant Label Generator 170 can receive raw unlabeled security text 110, and automatically generate distant security labels for entities and relations in accordance with the Security Ontology 150 and in reference to various Knowledge Bases 160 (e.g., WikiData). The generated labels can be attached to the security text 110 to produce security text with distant labels 180. The resulting labeled security text 180 can be used for Distant Supervision Training for joint extraction 190 on the adapted joint extraction model 140 to create the final output Security Language Model 200 for name-entity recognition (NER) and relation extraction (RE).

In various embodiments, the Distant Label Generator 170 generates distant security labels. As distant security labels are generated by the automated process of the Distant label generator 170, including consulting Knowledge bases 160, the distant security labels may contain noise in forms of both false positives and false negatives, meaning that a security text phrase may be labeled incorrectly, or it may not be labeled when it should be.

In various embodiments, the Distant Supervision Training for joint extraction 190 transform the adapted joint extraction model 140 into the final Security Language Model 200 for name-entity recognition (NER) and relation extraction (RE) using the security text with distant labels 180. The process can reduce the negative effects that noisy distant labels impose on the adapted joint extraction model 140 being trained. A small set of likely high-quality training data can be identified, and during the training process gradually selects more likely high-quality training data that are similar to the data used for previous training to increase the size of the whole training dataset.

The output labels of the Security Language Model 200 are in accordance with those defined in the Security ontology 150.

Figure 2:
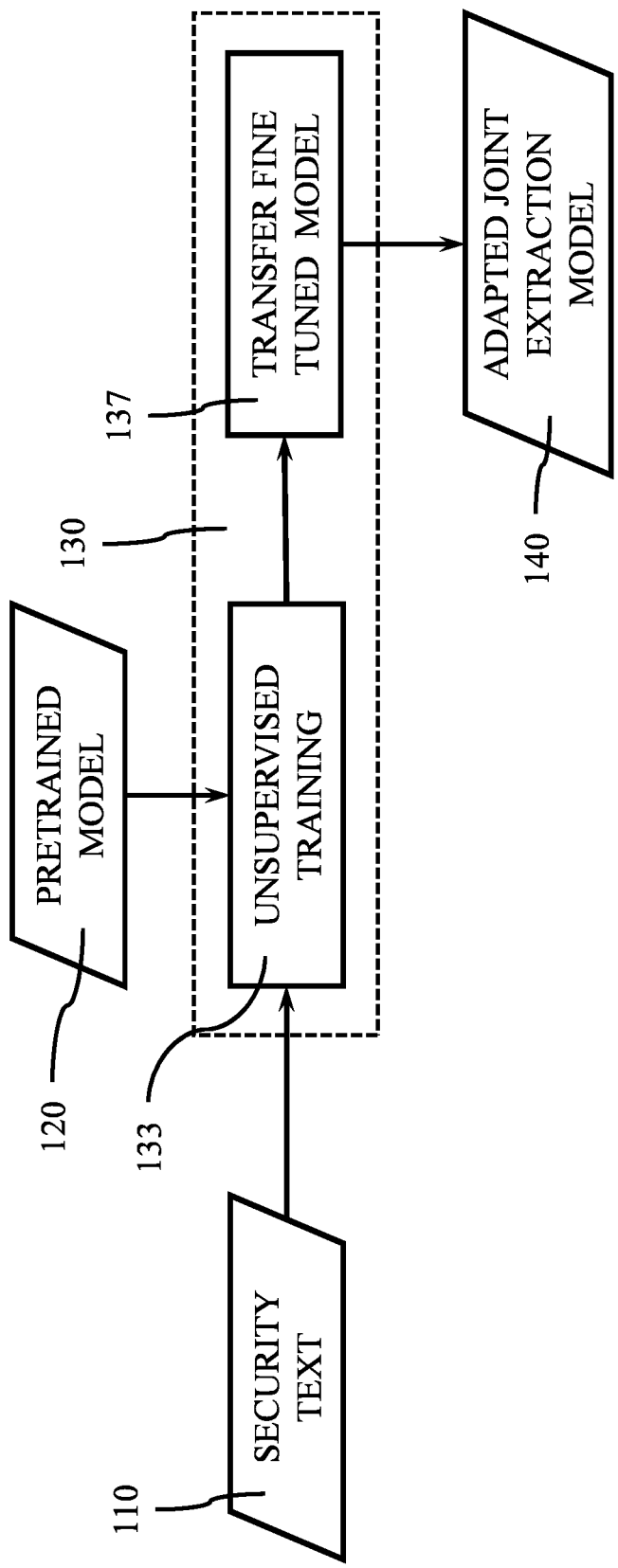
FIG. 2 is a block/flow diagram illustrating a system/method for model adaption, in accordance with an embodiment of the present invention.

Referring now to FIG. 2, a system/method for model adaption is illustratively depicted in accordance with an embodiment of the present invention.

In various embodiments, the pretrained language model 120 can be "re-trained" on unlabeled security text data 110, so the pretrained language model 120 can be adapted to domain-specific language usage and phrases in security text. In this "re-training," an unsupervised training method can be utilized for the Model Adaptor 130, which can combine a Head for casual language model 134 with the Pretrained language model 120. A transformer outputs a d-dimensional representation of each token in the input. During pre-training, the most relevant head is the language modeling one, which can use this d-dimensional representation to predict what the next token is. This combined model takes in sentences from security text data 110 and masks each word in those sentences to train the model to predict the masked words. The prediction is done by the Head for casual language model 134, and during the training, the Pretrained language model 120 is also being adjusted to the new distributions of words and phrases in the security text 110.

The fine-tuned language model 137 may be used to extract named entities and relations jointly from cybersecurity text. The Adapted joint extraction model 140 is provided.

After the unsupervised training, the Fine-tuned language model 137 is transferred to create the Adapted joint extraction model 140 as a whole to be trained for NER and RE on security text 110, where the output of the previous training is a language model, which can then be further trained on specific tasks, for example, the NER and/or RE.

Figure 3:
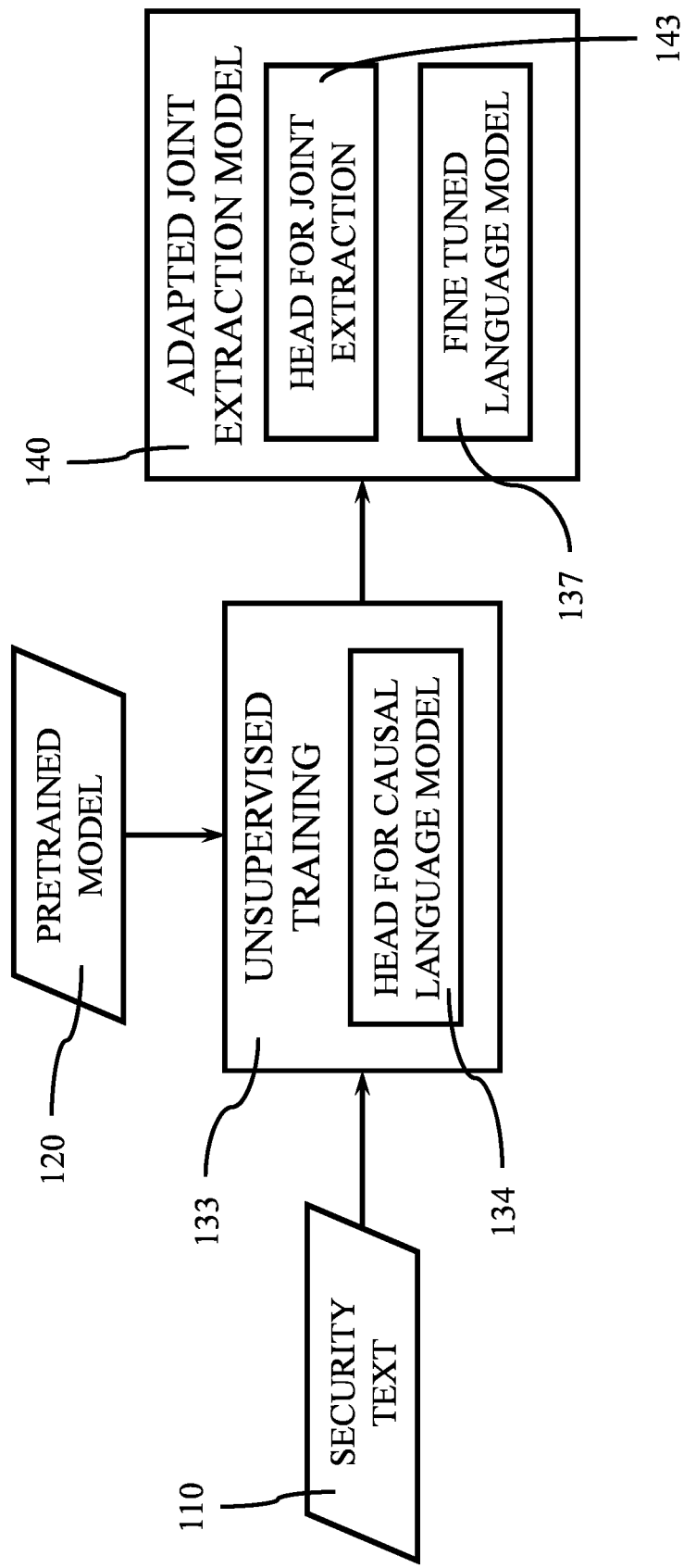
FIG. 3 is a block/flow diagram illustrating a system/method for model adaption, in accordance with an embodiment of the present invention.

FIG. 3 is a block/flow diagram illustrating a system/method for model adaption, in accordance with an embodiment of the present invention In this model, the Head for joint extraction 143 can perform entity and relation label prediction based on hidden representations of words and sentences provided by the Fine-tuned language model 137. The Adapted joint extraction model 140 includes the Head for joint extraction 143 and the Fine-tuned language model 137 from the unsupervised training.

Figure 4:
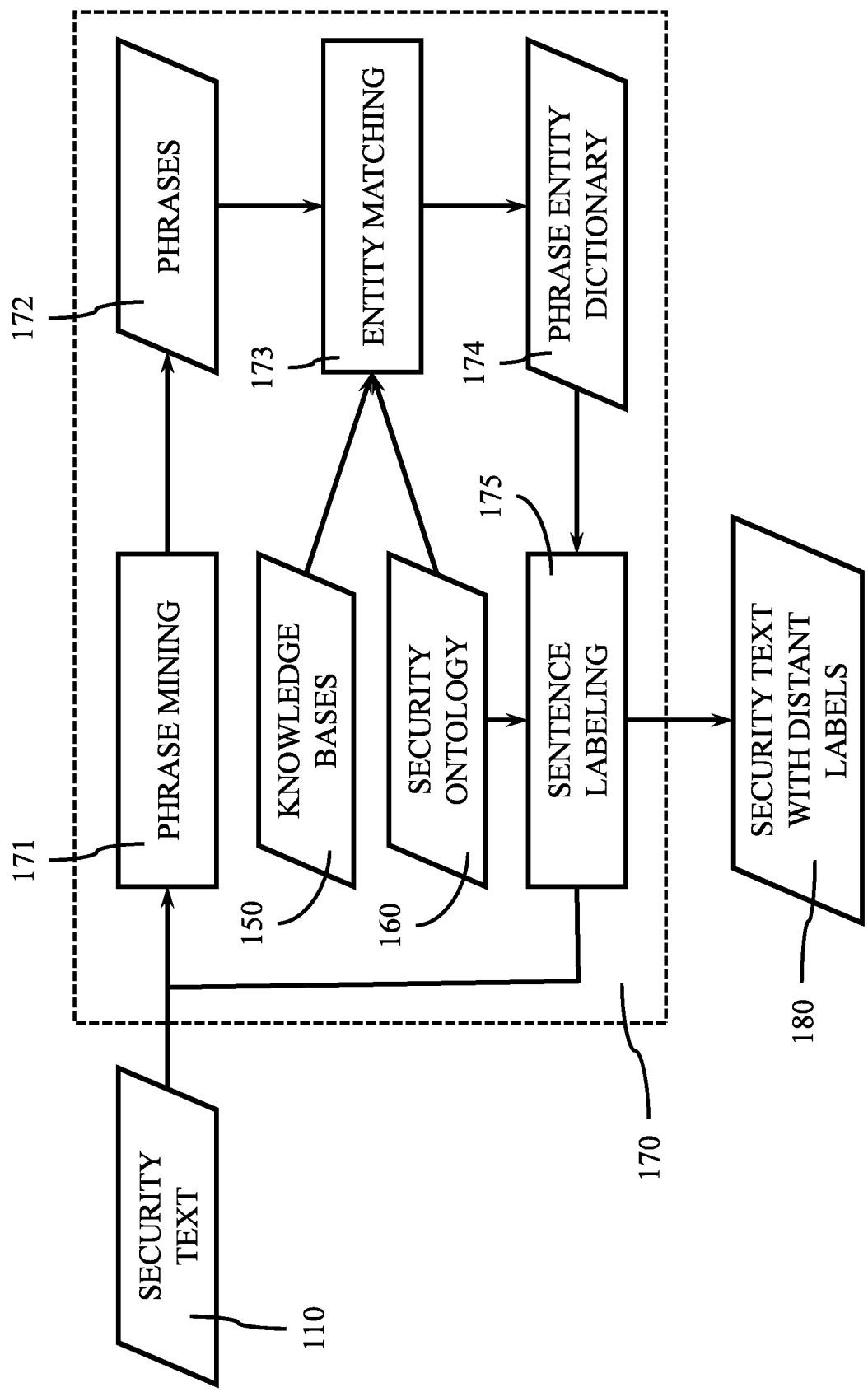
FIG. 4 is a flow diagram illustrating distant label generation, in accordance with an embodiment of the present invention.

FIG. 4 is a flow diagram illustrating distant label generation in accordance with an embodiment of the present invention.

In various embodiments, the unlabeled security text 110 can initially be segmented into n-grams through phase mining 171 to produce phrases 172. This enumerates the possible n-grams and uses part-of-speech rules to exclude stop words, verbs, and prepositions from those n-grams.

In various embodiments, the phrases 172 can be matched with entities obtained from the knowledge base(s) 160. The knowledge bases 160 can include some regular expressions, e.g., the one matching filenames, a dictionary containing security weakness terms, a list of common software product names, and a large knowledge base like WikiData. This uses a similarity match to find similar occurrences of the mined phrases 172 to entities in the knowledge bases 160. When an entity match is found, the type of entity match can be resolved in accordance with the Security ontology 150, and then the mined phrase 172 and the resolved type can be stored in a Phrase-entity dictionary 174.

In various embodiments, Sentence Labeling 175 takes the Security text 110 and uses the Phrase-entity dictionary 174 generated from the mined phrases 172 to label relevant phrases in the security text 110 with labels from the Phrase-entity dictionary 174. As phrases in the dictionary 174 may have overlapping words due to the n-gram enumeration in Phrase mining 171, this can use a greedy match to find the longest phrase in a sentence that matches with a dictionary entry.

If there are two entity labels in a sentence that constitute a defined relation in the Security ontology 150, the labeling process can label the first entity (head entity) with its entity label, and the second entity (tail entity) with the relation label. The output can be a list of labeled sentences, in which each labeled sentence has at most one head entity and zero to many tail entities. In various embodiments, if an input sentence has multiple head entities, this step would make multiple labeled instances of the same sentence, each of which contains only one head entity.

Figure 5:
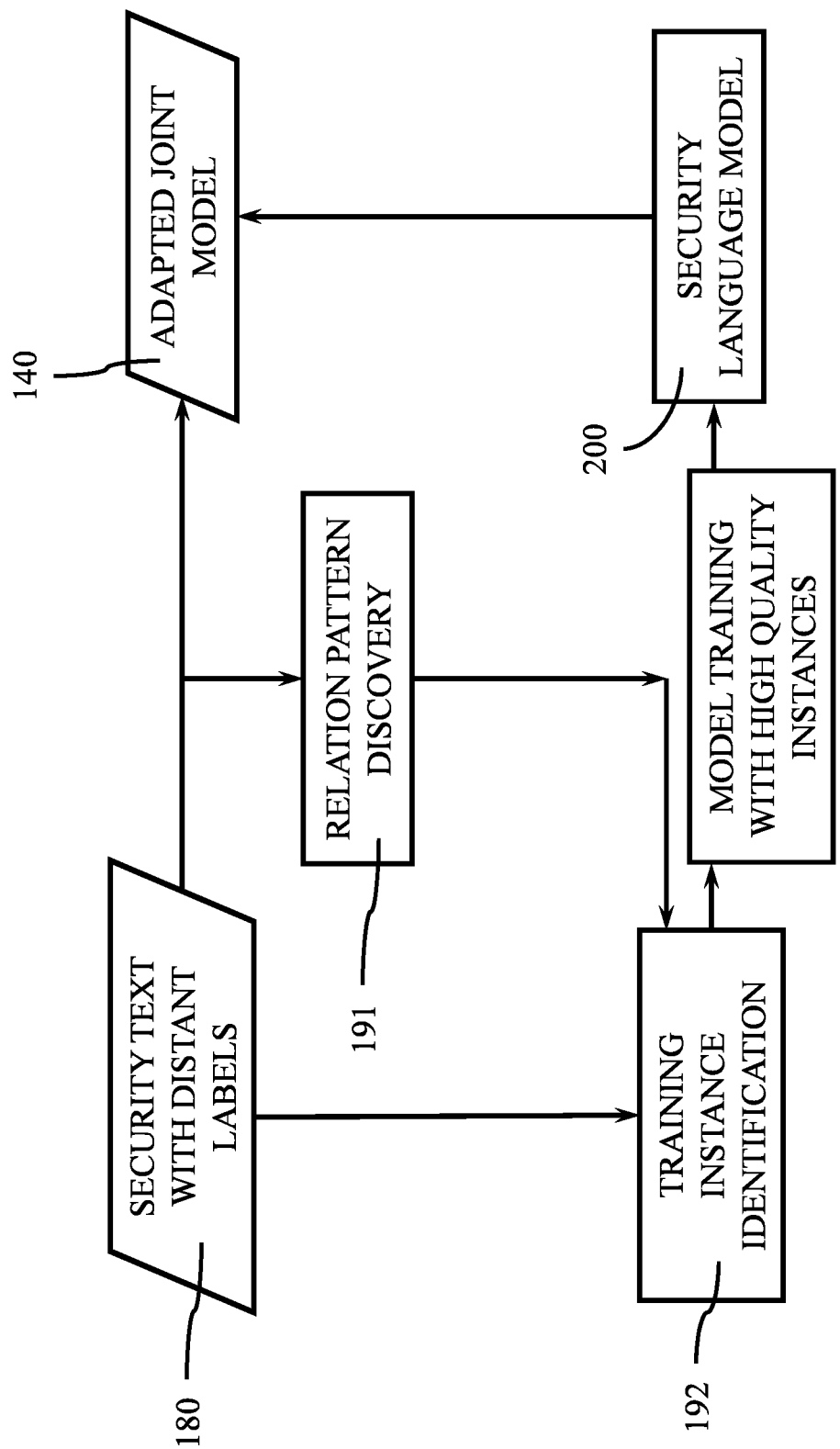
FIG. 5 is a flow diagram illustrating distant supervision training for joint extraction, in accordance with an embodiment of the present invention.

FIG. 5 is a flow diagram illustrating distant supervision training for joint extraction, in accordance with an embodiment of the present invention.

Relation Pattern Discovery 191 can determine certain criteria, in the form of indicative relation pattern phrases related to entities and relations, that may be used for selection of more high-quality training data. To achieve the goal, this module interacts with Position Attention 138, which outputs attention scores for each word in a sentence, and then calculates a confidence score for each labeled sentence. When a labeled sentence has a similar attention score distribution to that of relation patterns from known high-quality labeled sentences, the confidence score will be high; otherwise, the confidence score will be low.

Training instance identification 192 uses a predefined threshold to choose labeled sentences that are likely to be of high quality into the training dataset based on the confidence scores.

Model training with high-quality instances 193 uses the identified training dataset to train the joint extraction model. It is notable that in addition to an ordinary training process in which sentences are fed into the model being trained and labels are used to provide guidance for the model to learn relations between input sentences and corresponding labels, this training process also teaches and regularizes Position Attention to attend to those relation pattern phrases identified in Relation pattern discovery 191. As a result, the model can learn how to distinguish between labeled sentences having or not having similar patterns for other steps in the training process to select more high-quality training data.

Figure 6:
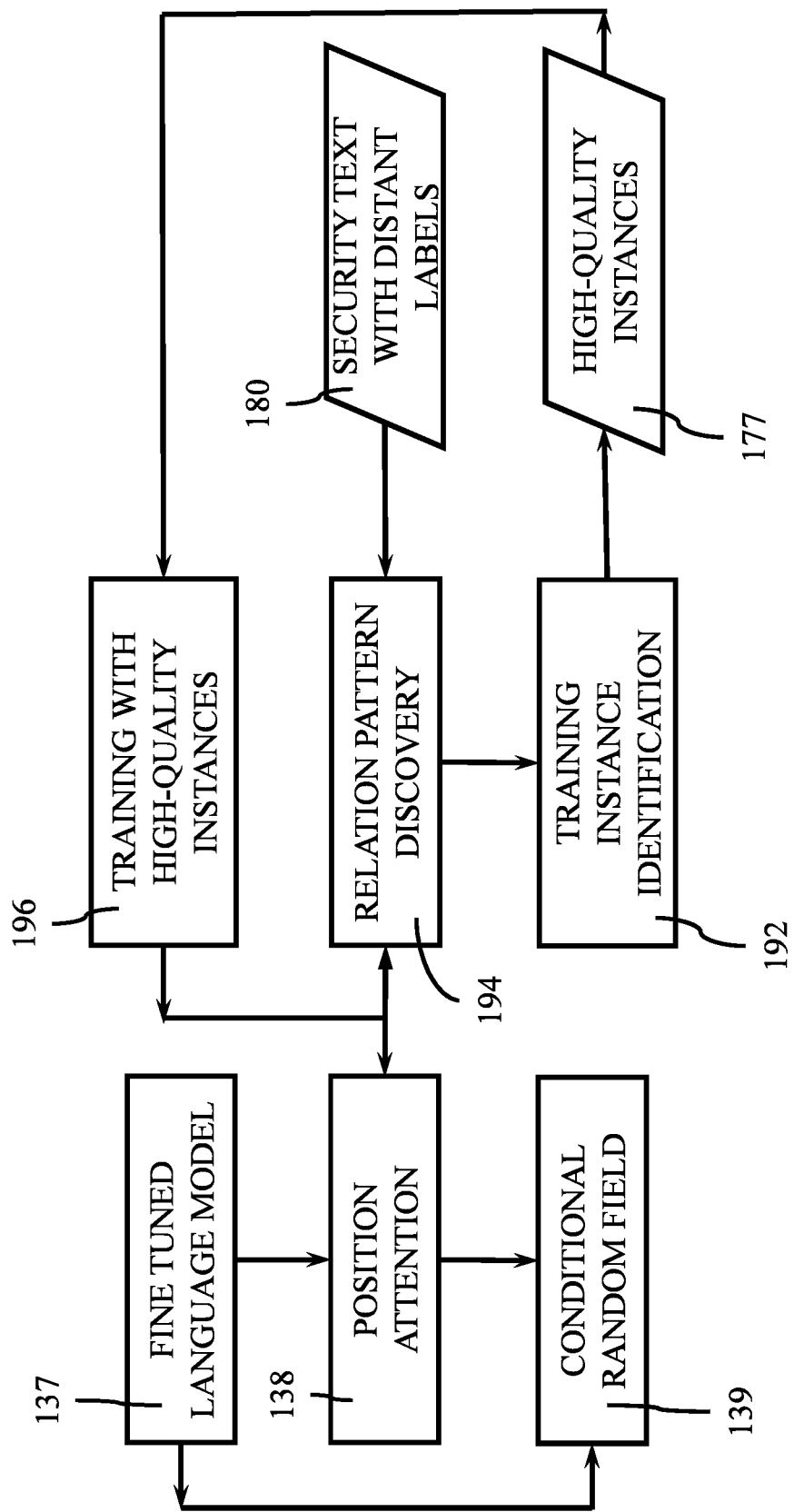
FIG. 6 is a flow diagram illustrating a detailed model view of an adapted joint extraction model, in accordance with an embodiment of the present invention.

FIG. 6 shows a detailed model view of the adapted joint extraction model in accordance with an embodiment of the present invention.

A Fine-tuned language model 137 is the output of the Unsupervised Training 133 on the pretrained model 120 utilizing the security text 110.

Position Attention 138 is a set of weights describing which tokens in an input sentence are more important than others given a query word for which the model predicts its entity label. And the Conditional Random Field 139 takes the hidden representations from the Fine-tuned language model 137 and attention weights from Position Attention 138, and infers a sequence of labels in which a query word can be labeled with its entity type if there exists one or no label otherwise, and other words can be labeled with either no label or relation labels indicating relation to the query word.

Relation pattern discovery 194 determines certain criteria, in the form of indicative relation pattern phrases related to entities and relations, that may be used for selection of more high-quality training data. Relation pattern discovery 194 interacts with Position Attention 138, which outputs attention scores for each word in a sentence, and then calculates a confidence score for each labeled sentence. When a labeled sentence has a similar attention score distribution to that of relation patterns from known high-quality labeled sentences, the confidence score will be high; otherwise, the confidence score will be low.

Training instance identification 192 uses a predefined threshold to choose labeled sentences that are likely to be of high quality into the training dataset.

Model training with high-quality instances 196 uses the identified training dataset to train the joint extraction model 140. It is notable that in addition to an ordinary training process in which sentences are fed into the extraction model 140 being further trained, and labels are used to provide guidance for the model 140 to learn relations between input sentences and corresponding labels. This training process also teaches and regularizes Position Attention 138 to attend to those relation pattern phrases identified in the Relation pattern discovery 194. As a result, the model can learn how to distinguish between labeled sentences having or not having similar patterns for other steps in the training process to select more high-quality training data.

After the unsupervised training, the Fine-tuned language model 137 is transferred to create an Adapted joint extraction model 140 as a whole to be the joint extraction model to be trained for NER and RE on security text. In this model, the Head for joint extraction 143 performs entity and relation label prediction based on hidden representations of words and sentences provided by the Fine-tuned language model 137.

In this step, 100: Security text is segmented into n-gram 620: Phrases. This step enumerates all possible n-grams and uses part-of-speech rules to exclude stop words, verbs, and prepositions from those n-grams.

Figure 7:
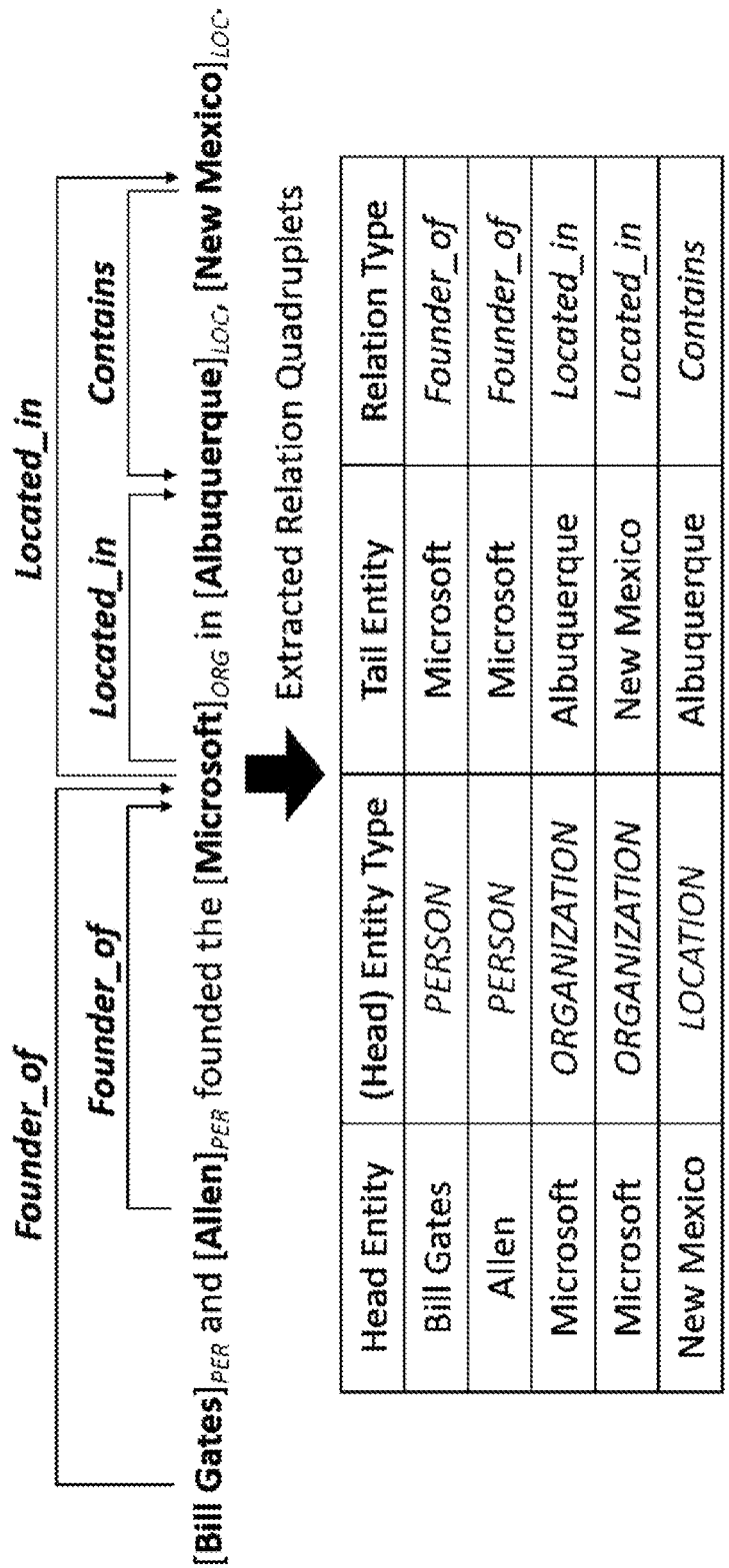
FIG. 7 shows an example of joint extraction on a sentence with overlapping relations that share the same entity, in accordance with an embodiment of the present invention.

FIG. 7 shows an example of joint extraction on a sentence with overlapping relations that share the same entity, in accordance with an embodiment of the present invention.

In order to cheaply acquire a large amount of labeled joint training data, distant supervision (DS) can automatically generate training data by aligning a knowledge base (KB) with an unlabeled corpus. These labels may be noisy and incorrect due to inaccurate and/or partial matches in the external dictionaries and knowledge bases. It can assume that if an entity pair have a relationship in a KB, all sentences that contain this pair also express the same corresponding relation. Distant supervision (DS) can also generate noisy and incomplete entity labels, which can degrade the performance of the joint extraction model.

For example, given a sentence "Bill Gates lived in Albuquerque" and the sentence in FIG. 7, DS may assign the relation type between "Bill Gates" and "Albuquerque" as Place_lived for both sentences. The words "lived in" in the first sentence is the pattern that explains the relation type, thus it is correctly labeled, while the second sentence is noisy due to the lack of corresponding relation pattern.

This approach assumes that (1) trustable relation labels, whose relation patterns precisely indicate the relationship between entity pairs, should be explained by the neural attention model, and (2) trustable relation labels also implicitly indicate trustable entity tags of the corresponding entity pairs. This approach leverages attention regularization to guide the model to attend to trustable relation patterns which explain the relation labels, and logic fusion that teaches the model the underlying entity-relation dependencies with open-domain probabilistic soft logic (PSL) rules.

In various embodiments, these two information sources are introduced to form a noise-robust loss function that can force the joint model to learn from high-quality instances with trustable entity and relation labels.

If the learned model clearly locates the relation patterns and understands entity-relation logic of candidate instances, we select them and those that contain the corresponding head entity or tail entities of the recognized patterns as trustable data for further bootstrap training. We iteratively learn an interpretable model and select trustable instances. These two steps are mutually reinforced. The more interpretable our model is, the better training instances are selected, and vice versa. This approach employs the sequence tagging with an end-to-end model to tag entities and overlapping relations simultaneously.

In various embodiments, a GPT-2 transformer backbone, that learns rich feature representations, into the tagging scheme. The attention mechanism of the Transformer builds direct connection between words and contributes to extraction of long-range relations, plus its multi-head attention weights indicate the interactions between each pair of words, which can be further fed into a position-attention mechanism to produce position-aware sentence representations. These representations can be used to decode different tagging results and finally extract all entities and their relations.

In various embodiments, the pre-trained GPT-2 transformer backbone into a sequence tagging scheme to jointly extract entities and overlapping relations. To reduce the impact of noisy labels on language model performance, we introduce attention regularization and logic fusion to guide the model to attend to confident relation patterns and entity-relation dependencies. Finally, we employ bootstrap learning to iteratively train on instances that can be explained by the model.

Figure 8:
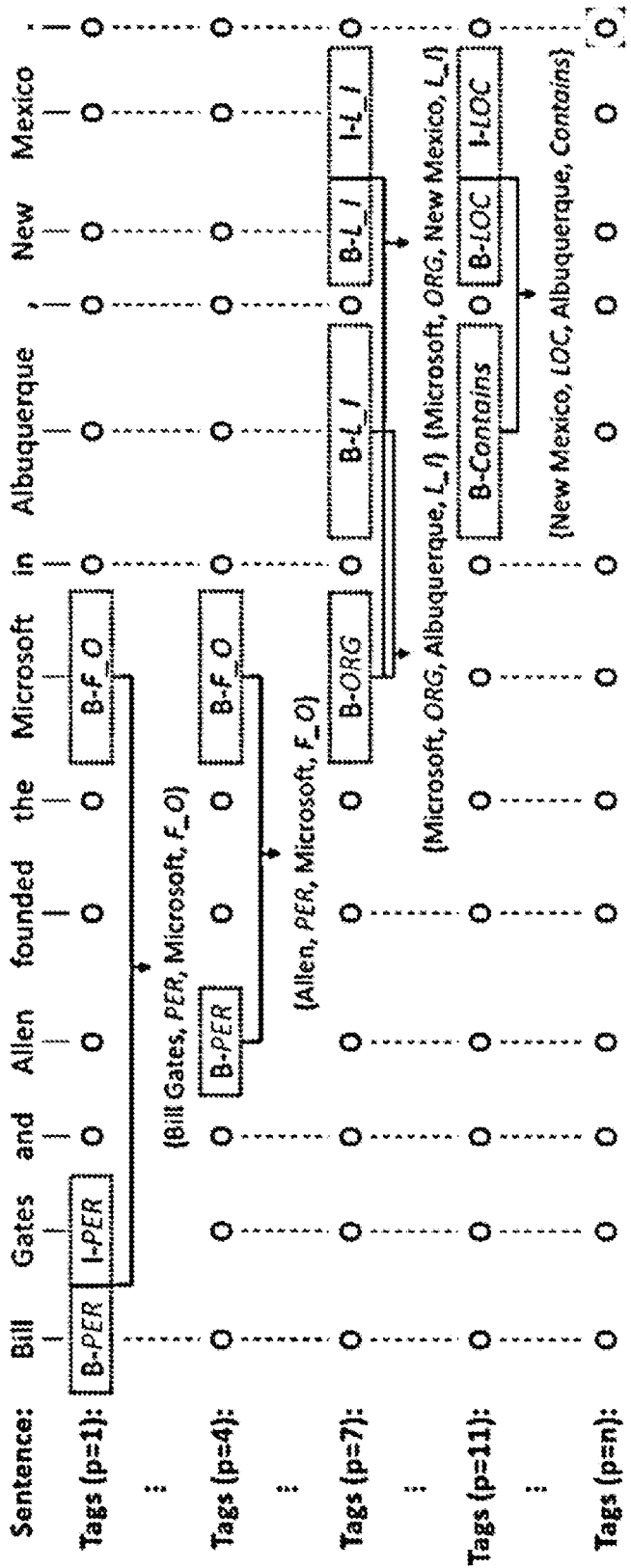
FIG. 8 shows an example of the tagging schema, where n is the sentence length, and $p \in [1, n]$ is the query word position, in accordance with an embodiment of the present invention.

FIG. 8 shows an example of the tagging schema, where n is the sentence length, and $p \in [1, n]$ is the query word position, in accordance with an embodiment of the present invention.

In various embodiments, for an n-token sentence, n different tag sequences can be annotated according to different query position p. For each tag sequence, if the query position p is the start of an entity (this sequence is an instance), the entity type is labeled at p, other entities which have relationship to the entity at p are labeled with relation types. The rest of tokens are labeled "O" (Outside), meaning that they do not correspond to the entity at p. In this way, relation quadruplet $\{e_1, \text{tags}, e_2, re\}$ can be extracted based on each tag sequence. Here, $e_1$ is the detected entity at p (head entity), tag1 is the entity type of e1, $e_2$ is the other detected entity that has relationship with $e_1$ (tail entity), and re is the predicted relation type between $e_1$ and $e_2$.

An example of the tagging schema used, where n is the sentence length, and $p \in [1, n]$ is the query word position. For each query p, we create an n-tag sequence to represent all overlapping relations corresponding to the entity at p. In this example, "PER" is short for entity type PERSON, "ORG" is short for ORGANIZATION, "LOC" is short for LOCATION, "F_O" is short for relation type Founder_of, "L_I" is short for Located_in.

For example, suppose p is 7, the token at this position is "Microsoft" and its tag is ORGANIZATION. Other entities, such as "Albuquerque" and "New Mexico", are labeled as Located_in and Located_in (notice that relations are unidirectional). The head entity "Microsoft" is used twice to form two different quadruplets in this case. If p is 9, the query entity "Albuquerque" has no relationship with other entities (as head entity), thus only the entity type LOCATION is labeled. If p is 13, all tokens are labeled as "0" because there is no entity at the position p to attend to.

If an instance contains a relation (e.g., p is 7), it is called a positive instance. Otherwise, it is a negative instance (e.g., p is 9). We apply "BIO" (Begin, Inside, Outside) signs to indicate the position information of tokens in the entity for both entity and relation type annotation, so that we can extract multi-word entities. Notice that we do not need the tail entity type, because every entity will be queried and we are able to obtain all entity types as well as their relations from the n tag sequences.

Figure 9:
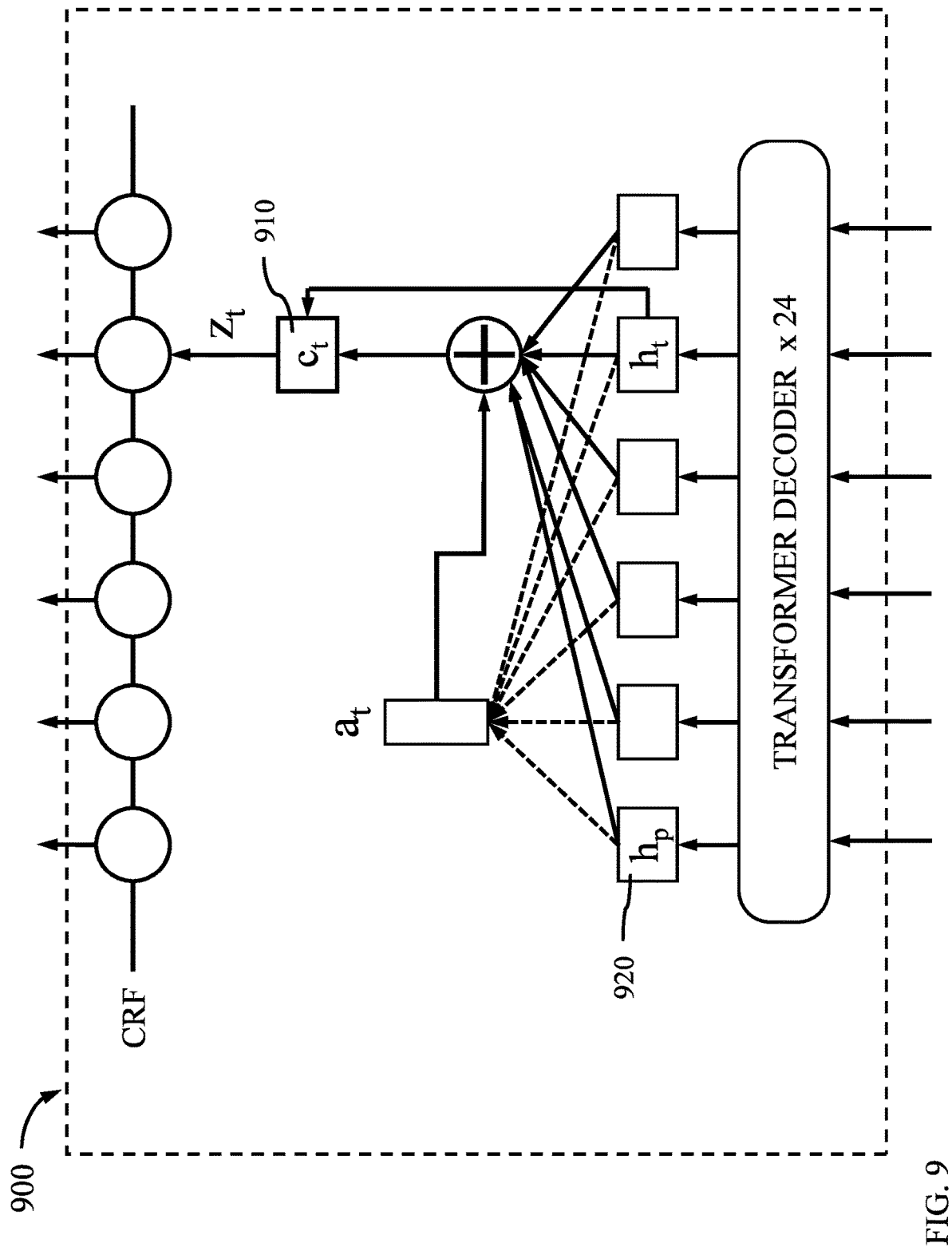
FIG. 9 shows an example of the neural network architecture and framework of the position-attentive sequence labeling model, in accordance with an embodiment of the present invention.

FIG. 9 shows an example of the neural network architecture and framework of the position-attentive sequence labeling model, in accordance with an embodiment of the present invention.

In various embodiments, a multilayer bidirectional Transformer 900 can be used that takes the input sequence, $S=\{w_t\}_{t=1}^{T}$, and converts the sequence into token-level representations, $H^0=\{h_t\}_{t=1}^{T}$, where $h_t \in \mathbb{R}^d$ is a d-dimensional vector corresponding to the t-th token in the sentence. For each token, its hidden vector is computed by summing the corresponding token and position embeddings. The model applies N transformer layers over the hidden vectors to produce contextual representations, $H^n = \text{Transformer}_n(H^{n-1})$, $n \in [1, N]$.

Each layer contains a multihead self-attention operation followed by a feed-forward layer over the hidden vector $H^{n-1}$.

$O^n = \text{MultiAttn}(\text{LN}(H^{n-1})) + H^{n-1}$;

$H^n = \text{FFN}(\text{LN}(O^n)) + O^n$;

where MultiAttn(•) is a multihead self-attention mechanism, FFN(•) is a two-layer feed-forward network, and LN(•) represents a layer normalization operation. Such sentence representations, though expressive, are inadequate for decoding the n tag sequences. Because position information of where to detect $e_1$ and other overlapping relations is lacking.

To detect an entity and its relationship with other entities, we introduce position-attention that encodes the query entity information as well as the context information of the whole sentence to generate position-aware and context-aware representations $\{x_t\}_{t=1}^{T}$:

$x_t = [h_t; c_t]$;

where $c_t = \text{Attn}(H, h_p, h_t)$ is an attention-pooling vector 910 of the whole sentence (H):

$\mu_{tj} = v^T \tan h(W^p h_p + W^h h_t + W^H h_j)$;

$a_{tj} = \exp(\mu_{tj}) / \Sigma_{k=1}^{T} \exp(\mu_{tj})$;

$c_t = \Sigma_{j=1}^{T} a_{tj} h_j$;

where $W^p$, $W^h$, $W^H$, and $v$ are parameters to be learned, $h_p$, $h_t$, $h_j$ are the hidden states 920 at position p, t, and j respectively, $\mu_{tj}$ is the score computed by comparing $h_p$ and $h_t$ with each of the sentence state $h_j$, and $a_{tj}$ is attention weight produced by normalizing $\mu_{tj}$. The query hidden state $h_p$, serves as comparing with the sentence representations to encode position information, and $h_t$ is used to match the sentence representations against itself to collect the context information. For each p, the attention mechanism produces different sentence representations and thus can model different tag sequence of a sentence.

A CRF Decoder, CRF, considers the correlations between labels in neighborhoods and jointly decodes the best chain of labels, which benefits sequence labeling models. For each position-aware representation $x_t$, the input sequence scores $Z=\{z_t\}_{t=1}^T$ is generated by:

$$z_t = W^z x_t;$$

where $z_t \in \mathbb{R}^V$ is the tag scores of the t-th token, V is the number of distinct tags, and $z_t^j$ is the score of the j-th tag at position t. For a sequence of labels $y=\{y_t\}_{t=1}^T$, the decoding score, score(Z, y), is the sum of the transition score from tag $y_t$ to tag $y_{t+1}$, plus the input score $z_t^{y_t}$ for each token position t. The conditional probability p(y|Z) is the softmax of score(Z, y) over all possible label sequences y' for Z. We maximize the log-likelihood of correct tag sequences during training:

$$\mathcal{L}_c = \Sigma_i \log p(y|Z);$$

Decoding searches for the tag sequence y* that maximizes the decoding score. The best tag sequence y* is computed using the Viterbi algorithm.

Attention Regularization (AR):

In various embodiments, the model can learn to attend to the patterns for identifying both entities and relations. For a given input sentence, $S=\{w_t\}_{t=1}^T$, an entity pair $(e_1, e_2)$ in S, a relation label, y, and a relation pattern, m, that explains the relation y of $e_1$ and $e_2$, we compute the corresponding attention guidance (target attention) score, $a^m$, according to the pattern mention significance (BOW frequency) conditional on the input m. And the attention guidance $a^I$ of an in-stance I is the average of $a^m$ of all patterns, m, corresponding to every relation y in this instance.

We expect the classifier to approximate its attention distribution $a^s$ to $a^I$. Here we define $a^s$ as the average pooling of model's position-attention:

$$a^s = \text{AvgPooling}(a_1, a_2, \ldots a_T);$$

where $a_t = \{a_{t_j}\}_{j=1}^T$, $t \in [1, T]$ is the vector of the normalized attention weight for each position, j, in the sentence. Kullback-Leibler (KL) divergence can be applied as the optimized function, which describes the difference between distributions:

$$KL = (a^I \| a^S) = \sum a^I \log \frac{a^I}{a^S}.$$

This can be further reduced as the following attention regularization loss:

$$\mathcal{L}_r = \Sigma a^I \log a^I - a^I \log a^s$$

For the attention guidance, the relation pattern bag-of-words (BOW) can be utilized to generate $a^I$.

$$b_t = \begin{cases} f(w_t | y) & w_t \in e_1, e_2, m \\ 0 & \text{else} \end{cases}$$

$$a_m = \left\{ \frac{b_k}{\sum_{i=1}^T b_i} \right\}_{k=1}^T$$

$$a^I = \text{AvgPooling}\left(a_{m_1}, \ldots, a_{m_{R_I}}\right)$$

where $b_t$ represents the BOW frequency of $w_t$ under relation y if $w_t$ belongs to entity words or corresponding relation pattern words. $R_I$ is the number of distinct relation types in instance I.

Logic Fusion (LF):

LF is to teach the model to attend to certain entity-relation coherence. Particularly, we summarize entity-relation dependencies as PSL rules (according to data ontology), and penalize training instances that violate any of the rules. For example, if the predicted relation type is Founder_of, the head entity type should be PERSON. We define the logic distance based on the model's softmax scores over the head entity given its predicted relation type to measure how severely it violates the logic rules.

For each training instance, we define an atom 1 as each tag and the interpretation I(l) as the soft truth value of the atom. For each rule r: relation→entity, under the interpretation I, the distance to satisfaction $d_r(I)$ is defined as:

$$d_r(I) = \max\{0, I(r_{relation}) - I(r_{entity})\}$$

PSL determines a rule, r, as satisfied when the truth value of $I(r_{relation}) - I(r_{entity}) \geq 0$. For each instance I, we set $l_1$ as the entity type (head) and $l_2$ as the relation type (tail). This equation indicates that the smaller $I(l_1)$ is, the larger penalty we have. We compute the distance to satisfaction for each ground rule and use the smallest one as the penalty because we only need one rule to be satisfied. We define the distance function $F(\bullet, \bullet)$ that minimizes all possible PSL rule grounding results, as described in Algorithm 1, i.e., $F(\bullet, \bullet)$ should return 0 when one PSL rule is satisfied. The prediction probabilities P(y|ei) over each entity $e_i$ are regarded as the interpretation $I(l_i)$ of the ground atom $l_i$, i={1, 2}. If no rules can be grounded, the distance is set as 0. We formulate the distance to satisfaction as a regularization term to penalize the predictions that violate any PSL rule:

$$\mathcal{L}_{pst} = \Sigma \mathcal{F}(\mathcal{R}; \{(P(y|e_i), \hat{y}_i)\})$$

where $P(y|e_i)$ is the softmax probability of zti in Equation (4) for position ti of ei in S, and Lpst is the sum of $F(\bullet, \bullet)$ over all entity-relation pairs $(e_1, e_2)$ in instance I. We finalize a noise-robust loss function by summing up the previous equations for $\mathcal{L}_c$, $\mathcal{L}_r$, and $\mathcal{L}_{pst}$ as:

$$\mathcal{L} = \mathcal{L}_c + \alpha \mathcal{L}_r + \beta \mathcal{L}_{pst};$$

where $\alpha$ is the attention regularization weight, and $\beta$ is the logic fusion weight.

Instance Selection:

According to the attention mechanism and entity-relation logic, a trained tagging model can tell the importance of each word for identifying the entity pair along with their relationship, and predict reasonable entity-relation label pairs. For a training instance I, if the model's attention weights do not match the target attention that explains the relation types in I, or its confidence distribution over entity and relation tags is inconsistent with the logic dependencies, this instance is probably a false positive. We still apply KL divergence to measure the probability that an instance is a false positive. Given the attention weights $a^s$ and softmax probabilities $P(y|e_i)$ from the joint model, and $a^I$, the confidence score, c, of an instance I is calculated as:

$$c = \frac{1}{1 + KL(a^T \| a^S) + \mathcal{F}(\mathcal{R}; I)}$$

The higher c is, the more confident an instance I is. The confidence score can be computed for all instances, I, in the training set and select those whose score is larger than threshold, τ. Based on our assumption that trustable relation labels also indicate trustable entity tags, we further select the negative instances that contain the head or tail entity for each relation pattern in the selected positive candidates.

In the framework, a particular step involves obtaining relation patterns, m, during the model training and instance selecting step. During the training, more precise patterns are needed to guide the model to attend to important evidence for joint extraction, while in the instance selection step, more versatile patterns are required to select more trustable data as well as to discover more confident relation patterns.

We first use a pattern extractor E to extract all relation patterns from an instance (we use the words between two entities as a relation pattern), and build an initial trustable pattern set M by counting all patterns up to select patterns with top 10% occurrences (max 20) for each relation type. Then we redistribute the training dataset D based on M. Specifically, all positive instances that match patterns in M, plus the negative instances that contain the head entity or tail entity of these patterns, are retained and used to train the model for epochs. Next, instance selection is run on D to select more trustable instances according to model's confidence scores over D. These new confident instances are used for the next training epoch, and are fed to E to obtain new trustable patterns that will be put into M. We repeat the above bootstrap procedure until the F1 score on the validation set does not increase.

In various embodiments, the training data is obtained by DS, while the test set is manually labeled to ensure its quality. Negative instances contain only the quadruplets with "None" relation type. A quadruplet is marked correct when its relation type, the two corresponding entities, and the head entity type are all correct. We build a validation set by randomly sampling 10% sentences from the test set.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method of adapting a pretrained language model to perform cybersecurity-specific named entity recognition and relation extraction, comprising:
   introducing a pretrained language model and a corpus of security text to a model adaptor;
   generating a fine-tuned language model through unsupervised training on the pretrained model by the model adapter utilizing the security text corpus;
   combining a language model from a head for joint extraction with the fine-tuned language model to form an adapted joint extraction model that can perform entity and relation label prediction by retraining the adapted joint extraction model to predict masked sentences from security text;
   generating distant labels by applying noise, including false positives and false negatives, to security text in the corpus of security text aligned with security knowledge bases through similarity to produce security text with distant labels; and
   performing Distant Supervision Training for joint extraction on the adapted joint extraction model using the security text with the distant labels to transform the adapted joint extraction model into a Security Language Model for name-entity recognition (NER) and relation extraction (RE) by:
      predicting entity labels for determined important tokens in a query word based on position-aware and context-aware representations generated using position attention that encodes query entity information and context information of a query sentence;
      calculating confidence scores for the entity labels by determining indicative relation pattern phrases from labeled sentences through relation pattern discovery; and
      training the adapted joint extraction model with a training dataset that includes labeled sentences with the entity labels having confidence scores above a quality threshold.

2. The method of claim 1, wherein the pretrained model is GPT-2.

3. The method of claim 2, wherein applying labels to security text utilizes a security ontology that provides a schema of structured knowledge, wherein the security ontology includes entity types and relations for cybersecurity and used as labels on the cybersecurity text.

4. The method of claim 3, wherein there are eight entity types, that include: (1) VULN denoting a vulnerability entity; (2) ACTOR denoting malicious actors that pose threats; (3) THREAT denoting a descriptive entity of threats to a target system; (4) FUNCTION denoting a program function name that appears in security-related reports; (5) FILE denoting a filename; (6) PRODUCT denoting a product name; (7) VERSION denoting a version number of the product; and (8) OBJECT denoting miscellaneous entities.

5. The method of claim 4, wherein there are seven relation types, that include: (1) VULN_RESULTS_IN_THREAT indicating a potential causal relation between VULN and THREAT entities; (2) VULN_AFFECTS_PRODUCT indicating an effect of a VULN entity on a PRODUCT entity; (3) VULN_HAS_ROOT_CAUSE_IN_FUNCTION indicating a causal relation between VULN and FUNCTION entities; (4) VULN_HAS_ROOT_CAUSE_IN_FILE indicating a causal relation between VULN and FILE entities; (5) ACTOR_EXPLOITS_VULN indicating that an ACTOR entity exploits a VULN entity; (6) THREAT_INVOLVES_OBJECT indicating that a THREAT entity involves one or more OBJECT entities in a course of an instance of cyberattack; and (7) PRODUCT_HAS_VERSION indicating a PRODUCT entity has a specific VERSION.

6. The method of claim 3, further comprising distant label generation, wherein distant label generation takes in unlabeled security text, and automatically generates the distant labels for entities and relations in accordance with the security ontology and in reference to Knowledge bases.

7. The method of claim 6, wherein the fine-tuned language model extracts named entities and relations jointly from the corpus of security text.

8. The method of claim 7, wherein the GPT-2 is a multilayer bidirectional Transformer that converts an input sequence of the cybersecurity text into token-level representations, $H^0 = \{h_t\}_{t=1}^T$, where $h_t \in \mathcal{R}^d$ is a d-dimensional vector corresponding to a t-th token in a cybersecurity text sentence.

9. The method of claim 8, wherein for a given input security text sentence, $S=\{w_t\}_{t=1}^T$, an entity pair $(e_1, e_2)$ in S, a relation label, y, and a relation pattern, m, that explains the relation y of $e_1$ to $e_2$, a corresponding attention guidance score, $a^m$, is calculated according to a pattern mention significance conditional on the relation pattern, m.

10. The method of claim 9, wherein each transformer layer of the multilayer bidirectional Transformer includes a multi-head self-attention operation.

11. A method of adapting a pretrained language model to perform cybersecurity-specific named entity recognition and relation extraction, comprising:
    introducing a pretrained GPT-2 language model and a corpus of security text to a model adaptor, wherein the GPT-2 is a multilayer bidirectional Transformer that converts an input sequence of a cybersecurity text into token-level representations, $H^0=\{h_t\}_{t=1}^T$, where $h_t \in \mathcal{R}^d$ is a d-dimensional vector corresponding to a t-th token in a cybersecurity text sentence;

generating a fine-tuned language model through unsupervised training on the pretrained model by the model adapter utilizing the security text corpus;

combining a language model from a head for joint extraction with the fine-tuned language model to form an adapted joint extraction model that can perform entity and relation label prediction by retraining the adapted joint extraction model to predict masked sentences from security text;

generating distant labels by applying noise, including false positives and false negatives, to security text in the corpus of security text to produce security text with distant labels; and performing Distant Supervision Training for joint extraction on the adapted joint extraction model using the security text with the distant labels to transform the adapted joint extraction model into a Security Language Model for name-entity recognition (NER) and relation extraction (RE) by:

predicting entity labels for determined important tokens in a query word based on position-aware and context-aware representations generated using position attention that encodes query entity information and context information of a query sentence;

calculating confidence scores for the entity labels by determining indicative relation pattern phrases from labeled sentences through relation pattern discovery; and training the adapted joint extraction model with a training dataset that includes labeled sentences with the entity labels having confidence scores above a quality threshold.

12. The method of claim 11, wherein each transformer layer of the multilayer bidirectional Transformer includes a multi-head self-attention operation.

13. The method of claim 12, wherein applying labels to security text utilizes a security ontology that provides a schema of structured knowledge, wherein the security ontology includes entity types and relations for cybersecurity and used as labels on the cybersecurity text.

14. The method of claim 13, wherein there are eight entity types, that include: (1) VULN denoting a vulnerability entity; (2) ACTOR denoting malicious actors that pose threats; (3) THREAT denoting a descriptive entity of threats to a target system; (4) FUNCTION denoting a program function name that appears in security-related reports; (5) FILE denoting a filename; (6) PRODUCT denoting a product name; (7) VERSION denoting a version number of the product; and (8) OBJECT denoting miscellaneous entities.

15. The method of claim 14, wherein there are seven relation types, that include: (1) VULN_RESULTS_IN_THREAT indicating a potential causal relation between VULN and THREAT entities; (2) VULN_AFFECTS_PRODUCT indicating an effect of a VULN entity on a PRODUCT entity; (3) VULN_HAS_ROOT_CAUSE_IN_FUNCTION indicating a causal relation between VULN and FUNCTION entities; (4) VULN_HAS_ROOT_CAUSE_IN_FILE indicating a causal relation between VULN and FILE entities; (5) ACTOR_EXPLOITS_VULN indicating that an ACTOR entity exploits a VULN entity; (6) THREAT_INVOLVES_OBJECT indicating that a THREAT entity involves one or more OBJECT entities in a course of an instance of cyberattack; and (7) PRODUCT_HAS_VERSION indicating a PRODUCT entity has a specific VERSION.

16. The method of claim 15, wherein for a given input security text sentence, $S=\{w_t\}_{t=1}^T$, an entity pair $(e_1, e_2)$ in S, a relation label, y, and a relation pattern, m, that explains the relation y of $e_1$ to $e_2$, a corresponding attention guidance score, $a^m$, is calculated according to a pattern mention significance conditional on the relation pattern, m.

17. The method of claim 16, wherein each transformer layer of the multilayer bidirectional Transformer includes a multi-head self-attention operation.

18. The method of claim 17, wherein for a sequence of labels $y=\{y_t\}_{t=1}^T$, a decoding score, score (Z, y), is calculated as a sum of a transition score from a tag $y_t$ to a tag $y_{t+1}$, plus an input score $z_t^{y_t}$ for each token position t.

19. The method of claim 18, wherein a tag sequence y* is computed using a Viterbi algorithm.

* * * * *